US006643759B2

(12) United States Patent
Andersson et al.

(10) Patent No.: US 6,643,759 B2
(45) Date of Patent: Nov. 4, 2003

(54) MECHANISM TO EXTEND COMPUTER MEMORY PROTECTION SCHEMES

(75) Inventors: Peter Koch Andersson, Hillerod (DK); Kevin D. Kissell, Le Bar sur Loup (FR)

(73) Assignee: MIPS Technologies, Inc., Mountain View, CA (US)

( * ) Notice: Subject to any disclaimer, the term of this patent is extended or adjusted under 35 U.S.C. 154(b) by 106 days.

(21) Appl. No.: 09/822,796

(22) Filed: Mar. 30, 2001

(65) Prior Publication Data

US 2002/0144077 A1 Oct. 3, 2002

(51) Int. Cl.[7] .......................... G06F 12/10; G06F 12/14
(52) U.S. Cl. ................. 711/207; 711/208; 711/156
(58) Field of Search .................. 711/205, 207, 711/208, 210, 145, 156

(56) References Cited

U.S. PATENT DOCUMENTS

| | | | |
|---|---|---|---|
| 5,628,023 A | 5/1997 | Bryant et al. | |
| 6,260,131 B1 * | 7/2001 | Kikuta et al. | 711/210 |
| 6,304,944 B1 | 10/2001 | Pedneau | 711/139 |
| 6,351,797 B1 * | 2/2002 | Beard, Sr. et al. | 711/207 |
| 6,408,373 B2 | 6/2002 | Burger et al. | 711/207 |
| 6,412,043 B1 * | 6/2002 | Chopra et al. | 711/118 |
| 6,418,523 B2 | 7/2002 | Porterfield | 711/207 |
| 6,430,664 B1 | 8/2002 | Chauvel et al. | 711/168 |
| 6,430,670 B1 | 8/2002 | Bryg et al. | 711/216 |

FOREIGN PATENT DOCUMENTS

| | | |
|---|---|---|
| EP | 115877 A2 | 8/1984 |
| EP | 425771 A2 | 5/1991 |

OTHER PUBLICATIONS

"Compatibility of Access Control Lists and Permission Bits in AIXV3" IBM Technical Disclosure Bulletin, IBM Corporation New York, US, vol. 34, No. 7B, Dec. 1, 1991, pp. 127–129.

* cited by examiner

Primary Examiner—Gary Portka
(74) Attorney, Agent, or Firm—Richard K. Huffman; James W. Huffman

(57) ABSTRACT

An apparatus and method are provided that enable a central processing unit (CPU) to extend the protection schemes afforded to virtual memory beyond that which an existing translation lookaside buffer within the CPU is capable providing while at the same time preserving compatibility with legacy operating system software. The apparatus includes a translation lookaside buffer (TLB) and extended protection logic. The translation lookaside buffer (TLB) stores a plurality of TLB entries, where each TLB entry of the plurality of TLB entries has a flags field and an extended flags field. The extended protection logic is coupled to the TLB. The extended protection logic specifies legacy access restrictions according to the flags field, and specifies the extended access restrictions according to the flags field in combination with the extended flags field. Specification of the legacy access restrictions preserves compatibility with a legacy virtual page access protocol.

36 Claims, 4 Drawing Sheets

*Conventional Virtual Memory Management*

*Mechanism for Extending Memory Protection Schemes*

FIG. 5

*Extended Protection States*

500

| RI | XI | D | V | ACCESS PROTECTION |
|----|----|---|---|-------------------|
| 0 | 0 | 0 | 0 | NO ACCESS |
| 0 | 0 | 0 | 1 | READ/EXECUTE ONLY |
| 0 | 0 | 1 | 0 | NO ACCESS |
| 0 | 0 | 1 | 1 | READ/WRITE/EXECUTE |
| 0 | 1 | 0 | 0 | NO ACCESS |
| 0 | 1 | 0 | 1 | READ ONLY |
| 0 | 1 | 1 | 0 | NO ACCESS |
| 0 | 1 | 1 | 1 | READ/WRITE ONLY |
| 1 | 0 | 0 | 0 | NO ACCESS |
| 1 | 0 | 0 | 1 | EXECUTE ONLY |
| 1 | 0 | 1 | 0 | NO ACCESS |
| 1 | 0 | 1 | 1 | WRITE/EXECUTE ONLY |
| 1 | 1 | 0 | 0 | NO ACCESS |
| 1 | 1 | 0 | 1 | NO ACCESS |
| 1 | 1 | 1 | 0 | NO ACCESS |
| 1 | 1 | 1 | 1 | WRITE ONLY |

MECHANISM TO EXTEND COMPUTER MEMORY PROTECTION SCHEMES

CROSS-REFERENCE TO RELATED APPLICATIONS

This application is related to co-pending U.S. patent application Ser. No. 09/822,783 entitled, Mechanism for Extending Properties of Virtual Memory Pages by a TLB, having a common assignee common inventors, and filed on the same date as this application.

BACKGROUND OF THE INVENTION

1. Field of the Invention

This invention relates in general to the field of memory management in within a computing system, and more particularly to an apparatus and method for extending the kinds of access protections for virtual memory pages beyond those provided for by page protection mechanisms within an existing translation lookaside buffer architecture.

2. Description of the Related Art

Early computing systems executed application programs that were composed especially to run on those systems. The programs consisted of a sequence of instructions that were loaded into the memory of the computing system at the time of execution. Address logic within the computing system generated a memory address each time an instruction was fetched from the memory for execution. Access logic within the computing system placed the memory address out on a memory address bus and the memory provided the contents of the memory location corresponding to the memory address for execution by the computing system. In addition to program instructions, the early computing systems employed memory locations to temporarily store data that was used by application programs. And like the retrieval of program instructions for execution, the storage and retrieval of program data involved the generation of memory addresses that corresponded to data memory locations.

The memory addresses generated by the address logic were directly routed to the early computing systems' memory busses to access corresponding memory locations. Hence, to access location 10513BC7h in memory required that the address logic generate address 10513BC7h and issue this address to the memory bus. But stated differently, it also is true that when the address logic generated address 10513BC7h, the memory location to which this address corresponded was also location 10513BC7h.

It is intuitive to observe that a direct, one-to-one correspondence between memory addresses generated by a program executing on an early computing system and locations in the computing system's memory was quickly deemed disadvantageous from many standpoints. First, in order to execute a wide variety of application programs, it was required that the early computing system always provide memory that spanned the full address range of the system. Second, such correspondence unnecessarily coupled the architecture of the computing system to the tools that were used to produce and execute programs on the system. For instance, programs required significant changes to enable the programs to execute on computing systems that exhibited different memory ranges and constraints. And finally, as computers progressed to the point of providing time-share (i.e., multi-tasking) operating systems, performance degradations were observed since all memory management and protection functions had to be performed by the operating systems.

Virtual memory management techniques were developed during the mid-1970's specifically to address the above-noted problems. In essence, a virtual memory "manager" within a computing processing unit (CPU) serves as an intermediary between address generation logic in the CPU and access logic that accesses memory locations. Under a virtual memory management scheme, a "virtual address" generated by the address logic is "translated" according to a predefined and configurable mapping strategy into a "physical address" that is placed on the memory bus to access a corresponding memory location. Hence, virtual memory management overcomes the above-noted limitations of one-to-one correspondence.

Virtual memory management techniques continue to provide benefits that enable the operating system of a computing system to effectively control where application programs are loaded and executed from memory, in addition to providing a means whereby memory can be assigned to a program while it is running and then released back into the memory pool when the memory is no longer required by the program. Most present day virtual memory management units divide a system's address space into equal-sized chunks called memory pages. To access a memory page requires translation of the upper bits of a virtual address; the lower bits of the virtual address are not translated and merely represent an offset into a page.

Virtual memory management not only applies to the locations associated with memory, but also to the properties, or attributes, associated with those locations. For instance, a virtual page may be designated as read-only so that data writes to locations in the page can be precluded.

The virtual-to-physical address mapping information, along with information specifying the attributes of virtual memory pages, are stored in a designated area of memory known as a page table. Generally speaking, a page table contains one entry for each virtual memory page within the address space of a CPU. Hence, for each memory access, it is required that the page table entry associated with the access be retrieved from the page table so that the virtual address can be translated into a physical address and so that access privileges can be determined.

Translation lookaside buffers (TLBs) have been incorporated into CPU designs to store frequently used page table entries within a CPU so that a memory access is not required each time an address is generated. A TLB is a very fast memory providing storage for a number of page table entries. TLBs are designed to be efficient and fast because they typically lie in the critical timing path of a CPU. Accordingly, only those bits that are essential to the translation of addresses and specification of memory page attributes are provided in a page table entry within a TLB.

TLBs are streamlined to support rapid access for the translation of addresses. As a result, however, the structure of a given TLB is quite static, yielding little or no room for expansion. Hence, if it is desired to update the design of a CPU to incorporate a newly developed or expanded set of memory access protection schemes, then it is highly probable that the design of the CPU's TLB must be modified to provide for expression of the access restrictions at the virtual page level. But for CPU's that have relegated a significant portion of their virtual memory management tasks to operating system software, changing the structure of an existing TLB creates incompatibilities with the operating system software-the operating system must be updated in order to provide for memory management according to the new/expanded access restrictions.

A significant market segment is lost, however, when an upgraded CPU becomes no longer compatible with an older operating system and its application programs. CPU manufacturers desire, at least, that CPU upgrades retain compatibility with older software. But compatibility retention in the case of a software managed TLB architecture implies that the number of access privileges that are provided for in a upgraded design be controlled by the existing TLB structure.

Therefore, what is needed is an apparatus that allows extended access protection schemes to be provided via an existing TLB design, where the structure of the TLB is maintained for compatibility with a legacy access protection protocol.

In addition, what is needed is a mechanism for extending the access restrictions of virtual memory pages that utilizes an existing TLB structure.

Furthermore, what is needed is a CPU apparatus that allows more kinds virtual memory page access privileges to be prescribed over that afforded by an existing TLB structure, where the TLB structure also is backwards-compatible with older operating system software.

Moreover, what is needed is a method for extending virtual memory page access protections of an existing TLB, but which defaults to states that can be interpreted according to a legacy access protection protocol.

SUMMARY OF THE INVENTION

The present invention provides a superior technique for extending the kinds of access protections afforded to virtual memory pages beyond that provided for by an existing translation lookaside buffer (TLB). The access protections of the virtual memory pages are extended according to the present invention without any detrimental impact on the structure of the TLB or any of the entries therein. The property extensions are provided for by the present invention in such a manner as to allow backwards compatibility with TLB management software in legacy operating systems.

In one embodiment, an apparatus for prescribing extended access restrictions for virtual memory pages is provided. The apparatus includes a translation lookaside buffer (TLB) and extended protection logic. The TLB stores a plurality of TLB entries, where each of the plurality of TLB entries has a flags field and an extended flags field. The extended protection logic is coupled to the TLB. The extended protection logic specifies legacy access restrictions according to the flags field, and specifies the extended access restrictions according to the flags field in combination with the extended flags field. The extended flags field provides further restrictions of the legacy access restrictions indicated by the flags field. Specification of the legacy access restrictions preserves compatibility with a legacy virtual page access protocol.

One aspect of the present invention features a mechanism in a microprocessor for enabling a translation lookaside buffer (TLB) to extend protection schemes of virtual memory pages. The mechanism has a memory management unit for accessing the virtual memory pages. The memory management unit includes TLB entries and extended protection logic. The TLB entries prescribe the protection schemes of the virtual memory pages, where an extended flags field within each of the TLB entries extends protection scheme indications provided for by an existing flags field. The extended protection logic is coupled to the TLB entries. The extended protection logic prescribes a legacy protection scheme according to the existing flags field or an extended protection scheme according to the existing flags field in combination with the extended flags field. The extended flags field provides for further definition of the protection scheme indications provided for by the existing flags field. The legacy protection scheme is backwards-compatible with a legacy virtual page access protocol.

Another aspect of the present invention contemplates a computer program product for use with a computing device. The computer program product includes a computer usable medium, having computer readable program code embodied in the medium. The computer readable program code causes a CPU to be described, the CPU being capable of accessing virtual memory pages according to a legacy protection scheme and an extended protection scheme. The computer readable program code has first program code and second program code. The first program code describes a translation lookaside buffer (TLB), where the TLB is configured to store TLB entries, each entry having an existing flags field and an extended flags field. The second program code describes extended protection logic, where the extended protection logic is configured to specify the legacy protection scheme according to the existing flags field and the extended protection scheme according to the existing flags field in combination with the extended flags field, whereby specification of the legacy protection scheme preserves compatibility with a legacy page access protocol. The extended flags field provides for further restriction of access privileges indicated by the existing flags field.

Yet another aspect of the present invention provides a computer data signal embodied in a transmission medium. The computer data signal includes first computer-readable program code, second computer-readable program code, and third computer-readable program code. The first computer-readable program code describes a translation lookaside buffer (TLB), the TLB being configured to store TLB entries, each of the TLB entries having an existing flags field and an extended flags field. The second computer-readable program code describes extended protection logic, the extended protection logic being configured to specify a legacy protection scheme according to the existing flags field and an extended protection scheme according to the existing flags field in combination with the extended flags field. The extended flags field specifies further restriction of access privileges specified according to the existing flags field. The third computer-readable program code describes access logic, the access logic being configured to access virtual memory pages, where, if a legacy access protocol is employed, the virtual memory pages are accessed in accordance with the legacy protection scheme.

Yet a further aspect of the present invention contemplates a method for accessing a virtual memory page. The method includes reading a first flags field from a translation lookaside buffer (TLB) entry, the first flags field preserving compatibility with a legacy virtual page access protocol by specifying legacy access restrictions in accordance with the protocol; reading a second flags field from the TLB entry, the second flags field in combination with the first flags field specifying extended access restrictions; and further restricting the legacy access restrictions specified by the first flags field according to the second flags field.

BRIEF DESCRIPTION OF THE DRAWINGS

These and other objects, features, and advantages of the present invention will become better understood with regard to the following description, and accompanying drawings where:

FIG. 5 is a table illustrating access protections prescribed by a TLB entry according to the present invention as a function of bit states within the TLB entry.

DETAILED DESCRIPTION

In light of the above background on the techniques employed by present day computing systems to expedite tasks related to virtual memory management, a related art example will now be discussed with reference to FIG. 1. This example highlights the limitations of current virtual page management techniques, particularly with respect to the structure of translation lookaside buffer (TLB) logic. The architecture of virtually all present day TLBs provides little room at most for expansion, and to preserve compatibility with legacy operating system software, any new access restriction that are provided must be compatible with the legacy operating system as well. Following this discussion, a detailed description of the present invention will be provided with reference to FIGS. 2 through 5. The present invention overcomes the obstacles to extending the protection schemes of virtual memory pages within a computing system by providing an apparatus and method for prescribing extended virtual page access privileges within a computing system that does not impact the computing system's existing TLB structure or the computing system's compatibility with legacy operating systems.

Figure 1:
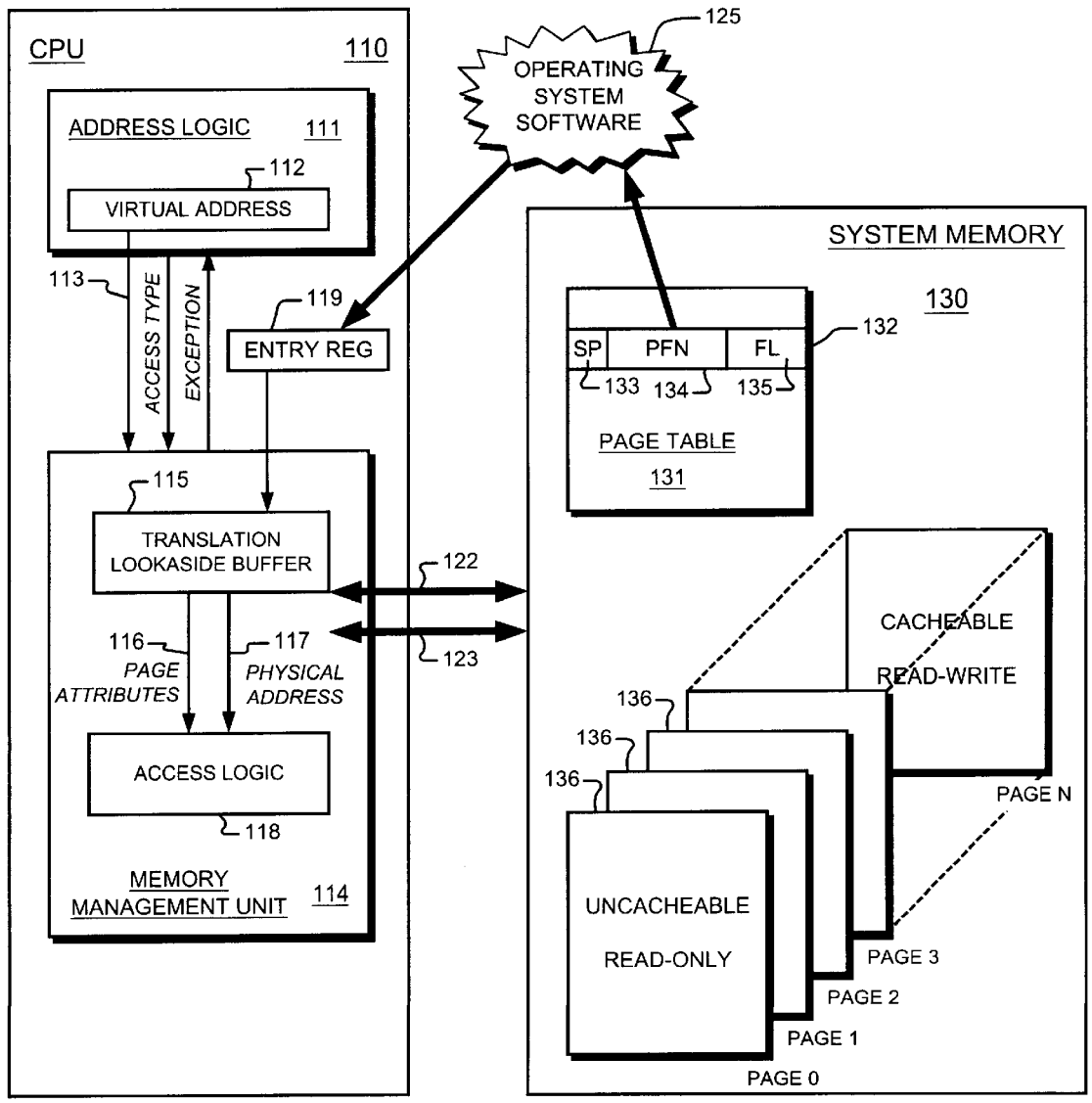
FIG. 1 is a block featuring a related art computing system that utilizes a translation lookaside buffer to expedite the management of virtual memory within the system.

Now referring to FIG. 1, a block diagram is presented featuring a related art computing system 100 that utilizes a translation lookaside buffer 115 to expedite the management of virtual memory 130. The computing system 100 includes a central processing unit (CPU) 110 that accesses system memory 130 via an address bus 122 and data bus 123. In some systems 100, the two busses 122, 123 are combined. The CPU 110, or microprocessor 110, has address logic 111 that provides a virtual address 112 (i.e., an address generated by an operating system 125 or application program executing on the system 100) to memory management logic 114. The memory management logic 114, or memory manger 114, has a translation lookaside buffer 115 for performing address translation and access logic 118 for accessing the system memory 130 via the address bus 122 and data bus 123. Within a virtual memory computing system 100, the system memory 130 is divided into a sequence of equal-sized memory pages 136, the most common size today being 4 KB/page. Hence, a CPU 110 having a 32-bit address range split into 4 KB memory pages 136 will manage the accessing of roughly 4 million pages 136. Certain pages 131 within memory 130 are specially designated to store all of the information that prescribes the translation of virtual addresses and other access features of each memory page 136. These specially designated pages 131 are called page tables 131. A page table 131 has entries 132 that correspond to each of the virtual memory pages 136.

The concept of virtual memory management allows the operating system software 125 to control how and where application programs are loaded into system memory 130 and how and where additional memory 130 is allocated to the programs. Virtual memory management techniques provide many advantages to a computing system 100 such as demand paging, address range extension, access protection, program relocation, memory allocation, and the ability to run multiple instances of the same application program. In general, the CPU 110 generates virtual program addresses 112 to access instructions and data in memory 130. From the point of view of a CPU 110, the system memory 130 contains all of the address locations that the CPU 110 is capable of generating. At one end of the spectrum, virtual memory management can be employed by operating system software 125 to allow application programs to run on the CPU 110 that span the full virtual address range of the CPU 110 while restricting the physical location of these programs to a small number of physical memory pages. This is done by translating (i.e., mapping) multiple virtual memory pages 136 to the same physical memory page. On the other extreme, an operating system 125 can use virtual memory techniques to run multiple instances of the same application program on the CPU 110 simultaneously, where each of the instances generate the same virtual addresses, yet each instance of the program is mapped to a different physical memory page than all of the other instances of the program. In addition to address translation, virtual memory management techniques enable operating systems to control the kinds of accesses that can be made to certain virtual memory pages 136. Note that virtual page 0 136 is designated as a read-only page that cannot be loaded into the CPU's memory cache (not shown). Similarly, virtual page N 136 is designated for both read and write accesses, and page N 136 can be loaded into the CPU's memory cache.

Operationally, the CPU's operating system 125 prescribes the contents of the page table 131. For each virtual memory page 136 in the system 100, a page table entry 132 is established. When the address logic 111 generates a virtual address 112 for the purposes of accessing memory 130, the virtual address 112 is provided via bus 113 to the memory management unit 114 along with the type of access that is requested (e.g., data read, data write, execution read, etc.). The page table entry 132 in the page table 131 that corresponds to the virtual memory page 136 within which the virtual address 112 is found must be provided to the memory management unit 114. A typical page table entry 132 has a physical frame number (PFN) field 134, a flags (FL) field 135, and a spare bits (SP) field 133. The PFN field 134 provides the upper address bits of a physical address corresponding to a physical memory page to which the virtual address 112 is mapped. The FL field 135 contains bits that control access to the virtual memory page 136 such as read/write access, cache policy, data valid/invalid, etc. If an access type is requested that is prohibited by bits in the FL field 135, then the memory management unit returns an exception to the address logic 111. In some page table designs, the SP field 133 is provided to accommodate address growth so that the number of bits in the PFN field 134 can be increased in the future.

In summary then, virtual memory management essentially comprises replacing the upper address bits of an address generated by an application program. The bits that are replaced are called a virtual page number. The replacement bits are called a physical frame number 134. The lower address bits are called a page offset because they designate a memory location within a virtual or physical page. Properties, or attributes, or each virtual page 136, such as those noted above, are prescribed by bits within the FL field 135 of the page table entry 132 that corresponds to the virtual page 136.

The TLB 115 is a cache structure that retains a subset of the page table 131 within fast memory in the CPU 110 so that the operating system 125 does not have to access the page table 131 each time a virtual address 112 is generated. Less frequently used entries 132 are dropped from the TLB 115 and new entries 132 are fetched from the page table 131 when it is found that no entry 132 exists in the TLB 115 for a virtual address 112 that requires translation. The circumstance under which no corresponding entry 132 exists within the TLB 115 for a submitted virtual address 112 is known as a TLB miss. The fetching of the corresponding new entry 132 from the page table 131 is called a TLB fill. In a system 100 that allocates TLB management tasks to the operating system 125, a TLB miss typically causes an exception to be generated by the CPU 110, whereby the operating system 125 is informed of the miss. Accordingly, the operating system 125 fetches the appropriate page table entry 132 from the page table 131 and writes the entry data to a TLB entry register 119. The operating system then executes an instruction that causes the contents of the TLB register 114 to be written into the TLB 115.

In the ideal case, a TLB miss is never encountered, thus avoiding the delays associated with TLB fills. But the reality is that TLB misses occur frequently, and to minimize the delay caused by having to access memory 130 to perform an address translation, present day TLBs 115 are typically designed to be very fast. One implication of a streamlined TLB design is that the number of bits within a TLB entry (not shown) are minimized, so that only essential information about a given virtual page 136 is stored within the TLB 115. One skilled in the art will appreciate that the structure of page table entries 132 in a software-managed TLB environment need not be equivalent to the structure of a TLB entry within the TLB 115, however, for performance reasons, most operating systems 125 design their page table entries 132 to correspond to the structure of the TLB 115. Some entry registers 119 do provide spare bits, but typically these bits are those remaining bits within bytes or words that the operating system 125 would otherwise fetch from memory 130 as a matter of course during a TLB fill operation.

In more recent years, the architecture of CPUs 110 has become increasingly sophisticated and complex. And to preclude developmental and production errors, working portions of existing microprocessor designs are now being re-used in upgraded versions of the designs. As one skilled in the art will appreciate, one of the biggest problems that computer system designers must face today is that of maintaining compatibility with legacy software, both in terms of operating systems compatibility and compatibility with existing application programs. Hence, when an upgraded version of a CPU 110 is fielded, it is required not only to be compatible with newer operating system software and applications software that exploit features added to the CPU 110, but the CPU 110 must also be compatible with older, legacy operating system software and applications software as well.

The present inventors have observed that legacy operating system software compatibility requirements have a detrimental impact on a CPU architecture 110 when many of the operations associated with the management of a TLB 115 have been allocated to operating system software. This is particularly true in those situations where a goal of a CPU upgrade is to extend the protection schemes afforded to virtual memory pages 136. The number of access restrictions (also called access privileges) of virtual memory pages 136 has grown as a result of applications that require a higher level of access security than what has previously been provided. For instance, present day access controls typically only restrict applications having a user privilege level (as opposed to kernel-level privileges) to specifying whether a page 136 can be read or whether it can be both read and written. But certain present day applications have requirements to further restrict accesses to a page 136. It is not uncommon today to find applications for computing systems 100 that require page access privileges to be prescribed as execute-only, data read-only, and, data write-only. Page access requirements such as these are very common to secure data and secure financial applications.

Hence, if a designer desires to increase the number of access privileges provided by a computing system 100 on a virtual page basis, the information regarding those policies must be expressed within each page table entry 132 and must accordingly be written to the TLB entry register 119 and processed by the memory management unit 114.

Regardless of what extended access privileges are to be prescribed at the virtual memory page level, however, if there are not a sufficient number of spare bits within existing entries in the TLB 115 and the TLB entry register 119 to express the desired extended properties, then a designer is forced to modify the design of the TLB 115 and entry register 119 to provide for the expression of the desired extended access restrictions for each virtual page 136. Yet, for systems 100 that rely upon operating system software 125 to perform virtual memory management tasks, changing the design of a TLB 115 instantly renders the systems 100 incompatible with legacy operating system software 125. Consequently, to provide for extended virtual page attributes, the most common approach that is employed today is to redesign the memory management unit 114 to increase the attribute capacity of the TLB 115, thus sacrificing compatibility with legacy operating systems 125 in order to provide for a set of desired extended memory management features. This approach, however, is entirely unacceptable within segments of the art that insist upon backwards operating system compatibility. But backwards compatibility with legacy access restriction protocols is a very important goal as well because a backwards-compatible CPU 110 can be produced in lieu of maintaining two or more separate products to service customers that use present and legacy operating systems.

The present invention overcomes the limitations of existing designs described above by providing an apparatus and method whereby designers can increase the number of virtual page protection schemes provided by an existing TLB 115 without having to sacrifice legacy operating system compatibility. The present invention will now be more specifically discussed with reference to FIGS. 2 through 5.

Figure 2:
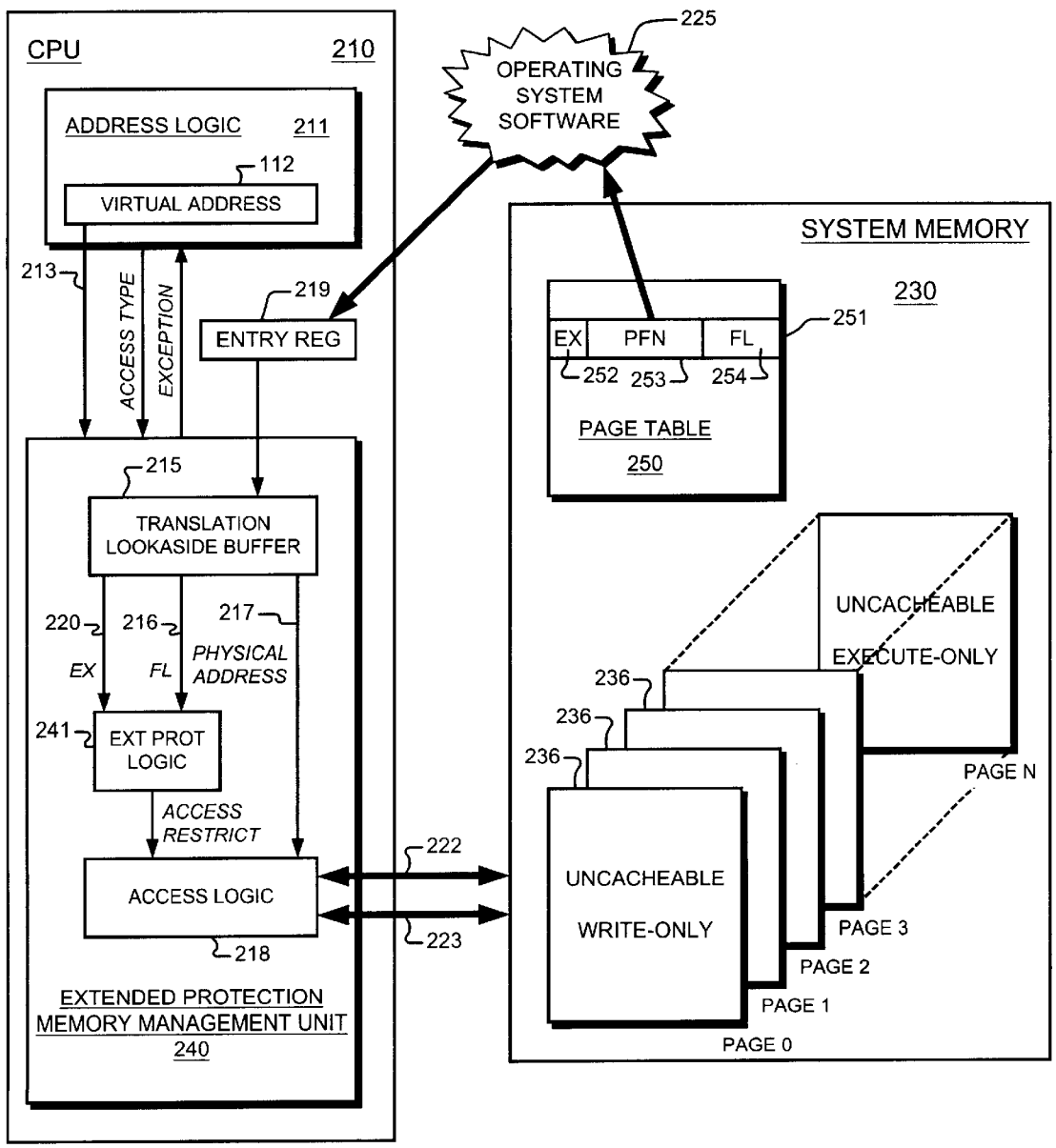
FIG. 2 is a block diagram illustrating a computing system according to the present invention that employs an existing translation lookaside buffer design to extend the access protections of virtual memory within the system.

Referring to FIG. 2, a block diagram is presented illustrating a computing system 200 according to the present invention that employs an existing translation lookaside buffer design 215 to extend the attributes of virtual memory 230 within the system 200. The computing system 200 has a CPU 210 coupled to system memory 230 via an address bus 222 and data bus 223, or a combined address/data bus 222/223. The CPU 210 has address logic 211 that generates virtual addresses 212. The virtual addresses 212 are routed to an extended protection memory management unit 240 via bus 213. The memory management unit 240 has a translation lookaside buffer 215 for performing virtual-to-physical address translation and access logic 218 for accessing the system memory 230 via the address/data bus 222/223. Entries within the TLB 215 are managed by operating system software 225 that loads entries via an entry register 219. The extended protection memory management unit 240 also has extended protection logic 241 that is coupled to the TLB 215 via an FL bus 216 and an EX bus 220.

The system memory 230 is divided into equal-sized virtual memory pages 236. In one embodiment, the pages 236 are 4 KB in size. In an alternative embodiment, the size of the pages 236 can be prescribed as 4 KB, 16 KB, 64 KB, 256 KB, 1 MB, 4 MB, 16 MB, or 64 MB. The memory 230 has a page table 250 that contains a plurality of page table entries 251 corresponding to each of the virtual memory pages 236. Each page table entry 251 has a physical frame number (PFN) field 253, a flags (FL) field 254, and an extended flags field 252. The extended flags field 252 employs bit positions corresponding to spare bits in entries in a legacy TLB 115, like the TLB 115 of FIG. 1.

In operation, elements of the computing system 200 according to the present invention function very similar to like-numbered elements of the computing system 100 of FIG. 1, the hundreds digit being replaced by a 2. The architecture of the TLB 215 and the TLB entry register 219 according to the present invention is exactly like that of their FIG. 1 counterparts. The differences, however, between the computing system 100 of FIG. 1 and the computing system 200 according to the present invention focuses on the manner in which the EX field 252 and FL field 254 of each page table entry 251 is loaded into the entry register, and processed and interpreted by the memory management unit 240. The EX field 252 can be configured by an extended privilege operating system, yet the initialization, or default, states of the bits in the EX field 252 render TLB entries 251 according to the present invention entirely compatible with legacy operating systems as well.

In the presence of a legacy memory management protocol, when a virtual address 212 is translated by the TLB 215, the translated physical address is provided to access logic 218 via bus 217 and contents of the EX field 252 and FL field 254 are provided to the extended memory protection logic 241. A legacy operating system 225 sets and interprets the bits of the EX field 252 according to the legacy memory management protocol (typically all 0's or all 1's) and employs the bits of the existing flags field 254 to indicate and invoke legacy access privileges. The extended protection logic 241 interprets and processes the contents of both fields 252, 254 to provide a simultaneous indication of legacy access privileges and extended access privileges for a given page 236, however, since the legacy operating system 225 sets the EX field 252 according to a legacy state, the corresponding bits of the TLB entry register 219 are set according to the legacy protocol. Hence, the extended protection logic 241 issues access restrictions according to the legacy memory management protocol, and thus, the legacy restrictions are employed by the access logic 218. In the presence of an extended access privileges operating system 225, both legacy restrictions and their extensions are employed to control accesses to the virtual memory pages 236. Under a legacy protocol, when contents of the FL field 254 indicate that a requested access type is prohibited, then the memory management unit 240 returns an exception to the address logic 211, thus precluding the requested access type according to the legacy protocol. Under an extended protocol, when contents of the FL field 254 and Ex field 252 indicate that a requested access type is prohibited, then the memory management unit 240 returns an exception to the address logic 211, thus precluding the requested access type according to the extended protocol. The extended protection logic 241 processes a set of legacy protection schemes according to the FL field 254 and a set of extended protection schemes according to a the EX field 252 in combination with the FL field 254. The states and meaning of the bits within the EX field 252 are prescribed so that they provide for further restrictions or further definition of those indications provided for by bits within the existing FL field 254.

By providing an extended flag field 252 that augments the indications provided for by an existing flags field 254, and by providing extended protection logic 241 that simultaneously indicates both legacy and extended access privileges, a CPU 210 according to the present invention can enjoy the benefits of improved virtual page management performance while retaining compatibility with legacy operating systems. For instance, the block diagram of FIG. 2 shows that the mechanism for extending computer memory protections according to the present invention can employ the same TLB architecture 115 as that of FIG. 1 to prescribe a set of virtual page access restrictions/privileges in corresponding to that which the page entries 132 of a related art computing system 100 are capable of expressing, yet the expression of these extended restrictions/privileges is backwards-compatible with the expression of restrictions/privileges according a legacy access protocol.

Figure 3:
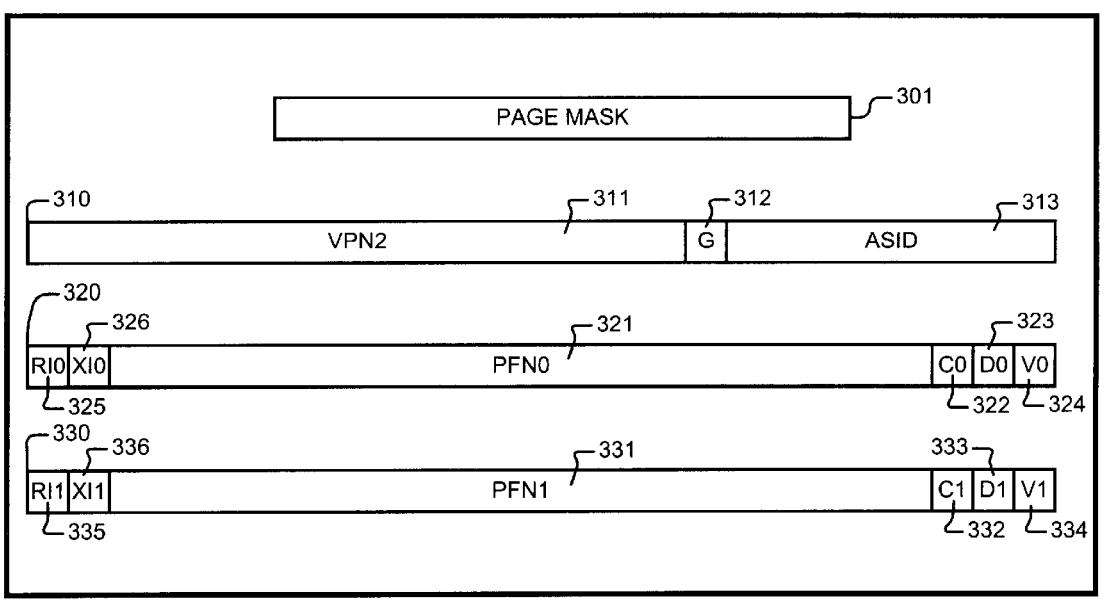
FIG. 3 is a diagram depicting a TLB entry register according to the present invention.

Now referring to FIG. 3, a diagram is presented depicting an exemplary TLB entry register 300 according to the present invention. The TLB entry register 300 has a page mask field 301, an entryhi field 210, an entrylo 0 field 320, and an entrylo 1 field 330. The entryhi field 310 has a virtual page number (VPN2) sub-field 311, a global (G) sub-field 312, and an application space identification (ASID) sub-field 313. The entrylo fields 320, 330 have corresponding physical frame number (PFN0, PFN1) sub-fields 321, 331, cache policy (C0, C1) sub-fields 322, 332, dirty (D0, D1) sub-fields 323, 333, and valid (V0, V1) sub-fields 324, 334. The dirty and valid sub-fields 323, 333, 324, 334 comprise existing flags corresponding to a legacy access protocol design. In addition, the entrylo fields 320, 330 have extended access sub-fields: read inhibit (R10, R11) 325, 335 and execute inhibit (X10, X11) 326, 336. The read inhibit and execute inhibit sub-fields 325, 326, 335, 336 are provided within spare bit fields according to the legacy access protocol design. The exemplary TLB entry register 300 shown in FIG. 3 reflects the structure of a page table and TLB according to the MIPS32™ architecture, however, one skilled in the art will appreciate from the foregoing discussion that extended memory protection features for virtually any present day microprocessor architecture can be derived from the exemplary TLB entry register 300 discussed herein without significant departure from the scope of the present invention.

In operation, the lower bits of a virtual address generated by address logic according to the present invention are employed as an offset into a virtual page and are not provided to the TLB. In an exemplary embodiment, the virtual address is a 32-bit address comprising a 12-bit offset (i.e., 4 KB page size) and a 20-bit virtual page number. Thus, page tables in memory contain entries for all of the virtual page numbers addressable by the CPU. In the exemplary embodiment, every application executing on the CPU is assigned a 6-bit ASID, or process ID. According to the exemplary embodiment, each page table entry 300 maps a concatenation of the application's ASID with the 20-bit virtual page number to a corresponding 20-bit physical frame number, cache policy, legacy privileges, and extended privileges. The VPN2 sub-field 311 of the exemplary entry 300 stores all of the bits of the virtual page number except the least significant bit. Logic within the TLB (not shown) employs the least significant bit to select one of the two entrylo fields 320, 330. If the least significant bit is a 0, then entrylo 0 320 is selected; if the least significant bit is a 1, then entrylo 1 330 is selected. The global sub-field 312 specifies whether or not an application's ASID is to be used in conjunction with its virtual page number for address translation. Translation that employs an application's ASID enables multiple instances of that application to execute at the same time on the CPU. If G 312 is not asserted, then the ASID sub-field 313 is ignored during address translation. Likewise, the contents of the page mask field 301 are employed to cause corresponding bits of a virtual page number to be ignored (i.e., masked) during translation. For example, in a 32-bit virtual address embodiment according to the exemplary TLB entry register 300, the page mask 301 is a 32-bit entity. If the page mask 301 is set to zero, then 4 KB virtual memory pages are prescribed. If bits 14-13 of the page mask 301 are set to 1, then 16 KB virtual page sizes are prescribed. 64 KB page sizes are prescribed by setting bits 16-13 to 1. One skilled in the art will appreciate how varied other page sizes can be specified as well by setting bits of the page mask 301. Hence, a virtual page number is concatenated with a corresponding process ID (ASID) and is submitted to a TLB. The TLB then matches the upper bits of the virtual page number with VPN2 311 in accordance with contents of the page mask field 301, and global 312 and ASID sub-fields 313. The least significant bit of the virtual page number selects either entrylo 0 320 or entrylo 1 330.

The entrylo fields 320, 330 provide a physical frame number 321, 331 that is concatenated to the offset for access to physical memory. Cache policy (e.g., cacheable, non-cacheable) for the corresponding virtual page is prescribed by the C sub-fields 322, 332. Memory access restrictions are prescribed by the read inhibit, execute inhibit, dirty, and valid sub-fields 325, 326, 323, 324, 335, 336, 333, 334. Under either a legacy or an extended access operating system protocol, if the valid sub-field 324, 334 is not asserted, then an exception is indicated because the data in the corresponding entry 300 is not valid. This mechanism is employed to mark a page that is not available for access by the CPU. Under both legacy and extended protocols, the dirty sub-field 323, 333 functions to indicate whether or not writes are allowed to a page. Hence, if the dirty sub-field 323, 333 in the entry 300 is asserted, then writes are enabled. Otherwise, writes to this page must be trapped. Under the legacy protocols, there is no distinction between execute and data privileges. Hence, the valid sub-field 324, 334 allows/precludes reads for both data accesses and instruction fetches.

Extended memory access schemes are enabled for corresponding virtual memory pages by the read inhibit and execute inhibit sub-fields 325, 326, 335, 336 in the presence of an extended access privilege operating system. In this case, the inhibit sub-fields 325, 326, 335, 336 provide for further distinction between data and instruction (i.e., execute) accesses, in addition to distinguishing a write-only access so that both data reads and instruction fetches can be cause exceptions when an unauthorized application attempts to read from particular virtual pages.

Figure 4:
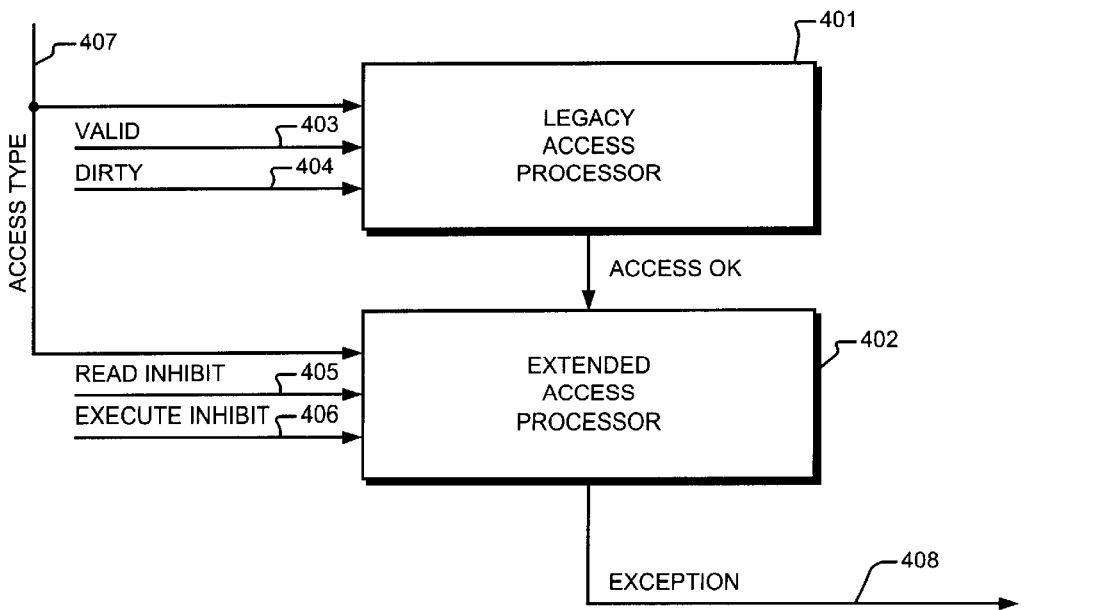
FIG. 4 is a block diagram showing extended protection logic within a virtual memory management unit according to the present invention.

Now referring to FIG. 4, a block diagram 400 is presented showing extended protection logic 401 within a virtual memory management unit according to the present invention. The extended protection logic 401 has a legacy access processor 401 and an extended access processor 402. Address logic according to the present invention provides a requested access type to both processors 401, 402 via signal 407. Contents of an existing flags field of a TLB entry are provided to the legacy access processor via a valid signal 403 and dirty signal 404. The legacy processor 401 decodes the legacy signals 403, 404 into legacy protection privileges and determines whether or not the requested access type is allowable. The legacy processor 401 indicates whether or not the access type is allowable by providing an access ok signal as an input to the extended access processor 402. The extended access processor 402 receives the access ok signal along with contents of an extended flags field of the TLB entry via read inhibit signal 405 and execute inhibit signal 406. The extended access processor 402 employs the inhibit signals 405, 406 to further define the meaning of the legacy protection privileges. If the requested access type has been allowed by the legacy access processor 401, and if the states of read inhibit 405 and execute inhibit 406 also indicate that the requested access type is allowable, then the extended access processor 402 accordingly sets the state of an exception signal 408.

Referring to FIG. 5, a table 500 is presented illustrating access protections prescribed by a TLB entry according to the present invention as a function of bit states within the TLB entry. The table 500 shows access protections that can be specified for virtual memory pages according to the present invention as a function of the following bit states in the TLB entry: read inhibit (RI), execute inhibit (XI), dirty (D), and valid (V).

Access is precluded to a virtual memory page by setting the valid bit to 0. In one embodiment, a legacy operating system sets the RI and XI bits to 0 in all entries because they are spare bits. Hence, the read/execute only and read/write/execute protections are prescribed by setting the state of the dirty bit with RI and XI set to 0 pertain to the only access restrictions obtainable using legacy access protocols.

Further enhancement of read/execute only and read/write/execute privileges are provided for according to the present invention by setting states of RI and XI. If RI is set to 1, with D set to 0 and V set to 1, then a page is protected against operations other than instruction fetches (i.e., execute only). If XI is set to 1, with D set to 0 and V set to 1, then a page is protected against operations other than data reads (i.e., read only). If both RI and XI are set to 1, with D set to 1 and V set to 1, then a page is protected against operations other than data writes (i.e., write only).

The examples of FIGS. 2 through 5 clearly convey that the protection schemes of virtual memory pages for a computing system can be effectively extended according to the present invention while at the same time preserving backwards compatibility of the computing system with operating system software. Access protection extension in the presences of backwards compatibility is provided by virtue of employing spare bits within an existing TLB entry in such a manner as to enhance the meaning of existing access protection bits. Because the spare bits are used only to extend the meaning of existing access protection bits, the meaning of the existing access protection bits are unaffected in the presence of legacy memory management code.

Although the present invention and its objects, features, and advantages have been described in detail, other embodiments are encompassed by the invention as well. In addition to implementations of the invention using hardware, the invention can be embodied in software disposed, for example, in a computer usable (e.g., readable) medium configured to store the software (i.e., a computer readable program code). The program code causes the enablement of the functions or fabrication, or both, of the invention disclosed herein. For example, this can be accomplished through the use of general programming languages (e.g., C, C++, etc.), hardware description languages (HDL) including Verilog HDL, VHDL, AHDL (Altera Hardware Description Language) and so on, or other programming and/or circuit (i.e., schematic) capture tools available in the art. The program code can be disposed in any known computer usable medium including semiconductor memory, magnetic disk, optical disc (e.g., CD-ROM, DVD-ROM, etc.) and as a computer data signal embodied in a computer usable (e.g., readable) transmission medium (e.g., carrier wave or any other medium including digital, optical or analog-based medium). As such, the code can be transmitted over communication networks including the Internet and intranets. It is understood that the functions accomplished and/or structure provided by the invention as described above can be represented in a core (e.g., a microprocessor core) that is embodied in program code and may be transformed to hardware as part of the production of integrated circuits. Also, the invention may be embodied as a combination of hardware and software.

In addition, the present invention has been particularly characterized in terms of a general purpose CPU or microprocessor. This characterization is presented herein as a representative embodiment for the present invention, however, such description should by no means restrict application of the concept of extending virtual memory access protection schemes. On the contrary, the present invention can be embodied within a graphics processor, a digital signal processor, as well as less commonly known components to include communications processors, video processors, second-tier memory management units, and micro controllers.

Furthermore, the present invention has been specifically presented in terms of a CPU that is capable of implementing certain well-known virtual page protection features provided for by the MIPS32™ and MIPS64™ architectures available from MIPS Technologies, Inc. These exemplary protection features are employed herein because they provide a recognizable basis for teaching the present invention, however, it should not be construed that application of the present invention is limited to these types or number of protection features. Rather, the present invention contemplates any form of page-based access control extensions provided for by a MIPS architecture TLB or the TLB of any other architecture or manufacturer.

Additionally, the present invention has been described herein in accordance with translation lookaside buffer (TLB) embodiments that consist of entries mapping one virtual page number to two physical page numbers, where such mapping is controlled by the least significant bit of a virtual page number. Although these types of TLBs are commonly encountered within the art, it is also noted that the present invention comprehends other TLB architectures as well. For instance, the present invention can be applied to TLB structures that map a single virtual page number to a single physical frame number as well.

Those skilled in the art should appreciate that they can readily use the disclosed conception and specific embodiments as a basis for designing or modifying other structures for carrying out the same purposes of the present invention, and that various changes, substitutions and alterations can be made herein without departing from the spirit and scope of the invention as defined by the appended claims.

What is claimed is:

1. An apparatus for prescribing extended access restrictions for virtual memory pages, the apparatus comprising:

a translation lookaside buffer (TLB), configured to store a plurality of TLB entries, each TLB entry of said plurality of TLB entries having a flags field and an extended flags field; and extended protection logic, coupled to said TLB, configured to specify legacy access restrictions according to said flags field, and configured to specify the extended access restrictions according to said flags field in combination with said extended flags field, wherein said extended flags field provides further restrictions of said legacy access restrictions indicated by said flags field, and wherein specification of said legacy access restrictions preserves compatibility with a legacy virtual page access protocol.

2. The apparatus as recited in claim 1, wherein said legacy access restrictions and the extended access restrictions are simultaneously specified.

3. The apparatus as recited in claim 2, wherein said legacy virtual page access protocol directs access to the virtual memory pages according to said legacy access restrictions.

4. The apparatus as recited in claim 3, wherein an extended virtual page access protocol directs access to the virtual memory pages according to the extended access restrictions.

5. The apparatus as recited in claim 1, wherein said legacy access restrictions comprise read-write-execute access and read-execute only access.

6. The apparatus as recited in claim 1, wherein said extended access restrictions comprise one or more of the following access types: read-execute only access, read-write-execute access, read only access, read-write only access, execute only access, write-execute only access, and write only access.

7. The apparatus as recited in claim 1, wherein said flags field comprises:

a valid bit, configured to indicate whether or not a particular virtual memory page is available for any form of access; and a dirty bit, coupled to said valid bit, configured to indicate whether or not said particular virtual memory page is available for a write access.

8. The apparatus as recited in claim 7, wherein said extended flags field comprises:

a read-inhibit bit, configured to indicate whether or not said particular virtual memory page is available for a read access; and an execute inhibit bit, coupled to said read inhibit bit, configured to indicate whether or not said particular virtual memory page is available for an execute access.

9. A mechanism in a microprocessor for enabling a translation lookaside buffer (TLB) to extend protection schemes of virtual memory pages, the mechanism comprising:

a memory management unit, for accessing the virtual memory pages, said memory management unit comprising:

TLB entries, for prescribing the protection schemes of the virtual memory pages, wherein an extended flags field within each of said TLB entries extends protection scheme indications provided for by an existing flags field; and extended protection logic, coupled to said TLB entries, configured to prescribe a legacy protection scheme according to said existing flags field or an extended protection scheme according to said existing flags field in combination with said extended flags field, wherein said extended flags field provides for further definition of said protection scheme indications provided for by said existing flags field, and wherein said legacy protection scheme is backwards-compatible with a legacy virtual page access protocol.

10. The mechanism as recited in claim 9, wherein said legacy protection scheme and the extended protection scheme are simultaneously prescribed.

11. The mechanism as recited in claim 9, wherein said legacy protection scheme comprises read-write-execute privilege and read-execute privilege.

12. The mechanism as recited in claim 9, wherein said extended protection scheme comprises one or more of the following access types: read-execute only privilege, read-write-execute privilege, read only privilege, read-write only privilege, execute only privilege, write-execute only privilege, and write only privilege.

13. The mechanism as recited in claim 9, wherein said existing flags field comprises:
    a valid bit, configured to indicate whether or not a particular virtual memory page is available for any form of access; and
    a dirty bit, coupled to said valid bit, configured to indicate whether or not said particular virtual memory page is available for a write access.

14. The mechanism as recited in claim 13, wherein said extended flags field comprises:
    a read-inhibit bit, configured to indicate whether or not said particular virtual memory page is available for a read access; and
    an execute inhibit bit, coupled to said read inhibit bit, configured to indicate whether or not said particular virtual memory page is available for an execute access.

15. A computer program product for use with a computing device, the computer program product comprising:
    a computer usable medium, having computer readable program code embodied in said medium, for causing a CPU to be described, said CPU being capable of accessing virtual memory pages according to a legacy protection scheme and an extended protection scheme, said computer readable program code comprising:
    first program code, for describing a translation lookaside buffer (TLB), said TLB configured to store TLB entries, each having an existing flags field and an extended flags field; and
    second program code, for describing extended protection logic, said extended protection logic configured to specify said legacy protection scheme according to said existing flags field and said extended protection scheme according to said existing flags field in combination with said extended flags field, wherein said extended flags field provides for further restriction of access privileges indicated by said existing flags field, and whereby specification of said legacy protection scheme preserves compatibility with a legacy page access protocol.

16. The computer program product as recited in claim 15, wherein said legacy protection scheme comprises read-write-execute privilege and read-execute only privilege.

17. The computer program product as recited in claim 15, wherein said extended protection scheme comprises one or more of the following access types: read-execute only privilege, read-write-execute privilege, read only privilege, read-write only privilege, execute only privilege, write-execute only privilege, and write only privilege.

18. The computer program product as recited in claim 15, wherein said existing flags field comprises:

a valid bit, configured to indicate whether or not a particular virtual memory page is available for any form of access; and
a dirty bit, coupled to said valid bit, configured to indicate whether or not said particular virtual memory page is available for a write access.

19. The computer program product as recited in claim 18, wherein said extended flags field comprises:
    a read-inhibit bit, configured to indicate whether or not said particular virtual memory page is available for a read access; and
    an execute inhibit bit, coupled to said read inhibit bit, configured to indicate whether or not said particular virtual memory page is available for an execute access.

20. A computer data signal embodied in a transmission medium, comprising:
    first computer-readable program code, for describing a translation lookaside buffer (TLB), said TLB configured to store TLB entries, each having an existing flags field and an extended flags field;
    second computer-readable program code, for describing extended protection logic, said extended protection logic configured to specify a legacy protection scheme according to said existing flags field and an extended protection scheme according to said existing flags field in combination with said extended flags field, wherein said extended flags field specifies further restriction of access privileges specified according to said existing flags field; and
    third computer-readable program code, for describing access logic, said access logic configured to access virtual memory pages, wherein, if a legacy access protocol is employed, said virtual memory pages are accessed in accordance with said legacy protection scheme.

21. The computer data signal as recited in claim 20, wherein, if an extended access protocol is employed, said virtual memory pages are accessed in accordance with said extended protection scheme.

22. The computer data signal as recited in claim 20, wherein said legacy protection scheme comprises read-write-execute privilege and read-execute privilege.

23. The computer data signal as recited in claim 20, wherein said extended protection scheme comprises one or more of the following access types: read-execute only privilege, read-write-execute privilege, read only privilege, read-write only privilege, execute only privilege, write-execute only privilege, and write only privilege.

24. The computer data signal as recited in claim 20, wherein said existing flags field comprises:
    a valid bit, configured to indicate whether or not a particular virtual memory page is available for any form of access; and
    a dirty bit, coupled to said valid bit, configured to indicate whether or not said particular virtual memory page is available for a write access.

25. The computer data signal as recited in claim 24, wherein said extended flags field comprises:
    a read-inhibit bit, configured to indicate whether or not said particular virtual memory page is available for a read access; and
    an execute inhibit bit, coupled to said read inhibit bit, configured to indicate whether or not said particular virtual memory page is available for an execute access.

26. A method for accessing a virtual memory page comprising:

reading a first flags field from a translation lookaside buffer (TLB) entry, the first flags field preserving compatibility with a legacy virtual page access protocol by specifying legacy access restrictions in accordance with the protocol;

reading a second flags field from the TLB entry, said second flags field in combination with the first flags field specifying extended access restrictions; and further restricting the legacy access restrictions specified by the first flags field according to the second flags field.

27. The method as recited in claim 26 further comprising:

specifying an access type; and issuing an exception signal if the access type is not permitted under the legacy access restrictions or the extended access restrictions.

28. The method as recited in claim 26 wherein the first flags field comprises:

a first portion indicating whether the virtual memory page is accessible; and a second portion indicating whether the virtual memory page is available for a write access.

29. The method as recited in claim 28 wherein the second flags field comprises:

a first portion indicating whether the virtual memory page is available for a read access; and a second portion indicating whether the virtual memory page is available for an execute access.

30. The method as recited in claim 26, wherein the extended access restrictions comprise read-execute only access.

31. The method as recited in claim 26, wherein the extended access restrictions comprise read-write-execute access.

32. The method as recited in claim 26, wherein the extended access restrictions comprise read only access.

33. The method as recited in claim 26, wherein the extended access restrictions comprise read-write only access.

34. The method as recited in claim 26, wherein the extended access restrictions comprise execute only access.

35. The method as recited in claim 26, wherein the extended access restrictions comprise write-execute only access.

36. The method as recited in claim 26, wherein the extended access restrictions comprise write only access.

* * * * *